US012504026B2

(12) United States Patent
Wetzstein

(10) Patent No.: US 12,504,026 B2
(45) Date of Patent: Dec. 23, 2025

(54) DEVICE, METHOD, AND SYSTEM FOR REMOVING A PUMP IMPELLOR FROM A PUMP SHAFT

(71) Applicant: Kurt George Wetzstein, Logan, IA (US)

(72) Inventor: Kurt George Wetzstein, Logan, IA (US)

( * ) Notice: Subject to any disclaimer, the term of this patent is extended or adjusted under 35 U.S.C. 154(b) by 0 days.

(21) Appl. No.: 18/668,464

(22) Filed: May 20, 2024

(65) Prior Publication Data

US 2025/0354567 A1 Nov. 20, 2025

(51) Int. Cl.
*F04D 29/62* (2006.01)
*B25B 13/06* (2006.01)
*B25B 21/02* (2006.01)

(52) U.S. Cl.
CPC .............. *F04D 29/62* (2013.01); *B25B 13/06* (2013.01); *B25B 21/02* (2013.01)

(58) Field of Classification Search
CPC ....................................................... F04D 29/62
See application file for complete search history.

(56) References Cited

U.S. PATENT DOCUMENTS 1,783,667 A 12/1930 Mueller
4,435,126 A 3/1984 Schneider
4,850,800 A * 7/1989 Zygutis .................. B63H 20/36 416/62
4,934,037 A 6/1990 Schuerg et al.
5,152,044 A 10/1992 Bales
5,192,142 A * 3/1993 Hyll ...................... F04D 29/628 403/26
5,257,556 A * 11/1993 Pineault .............. B25B 23/1422 81/60
5,341,553 A 8/1994 Herzhauser
6,116,855 A 9/2000 Maki
6,185,817 B1 * 2/2001 Sims ..................... B25B 27/023 29/259
6,394,753 B1 5/2002 Maki et al.
6,640,670 B2 * 11/2003 Belcher ............... B25B 27/0035 81/176.1
7,024,745 B1 * 4/2006 Mayer ....................... B25B 9/00 81/488
7,421,771 B2 * 9/2008 Heathman ............... B25B 13/02 294/92
7,472,662 B2 1/2009 Brueegen
9,957,977 B1 5/2018 Benford
9,957,979 B2 5/2018 Key
D823,658 S * 7/2018 Key ................................ D8/29
(Continued)

*Primary Examiner* — Kyle A Cook
(74) *Attorney, Agent, or Firm* — Dunlap Bennett & Ludwig PLLC

(57) ABSTRACT

A method for removing a pump impellor from an operatively associated pump shaft is provided. The method includes preventing rotation of the pump impellor in a first direction and simultaneously applying a torque to the pump shaft in the first direction, whereby the torque comprises continuous hammer impacts. A brace is used to prevent the rotation of the pump impellor, wherein the brace is fixed on a second end opposite the first end preventing rotation. A bolt connected to pump may fix the second end. An impact wrench with a socket having a shaft key operatively associated with the pump shaft notch may provide the simultaneous application of the torque.

5 Claims, 3 Drawing Sheets

(56) References Cited

U.S. PATENT DOCUMENTS

| | | | |
|---|---|---|---|
| 10,641,265 | B2 | 5/2020 | Kimball et al. |
| 2005/0077730 | A1 | 4/2005 | Thut |
| 2007/0003406 | A1 | 1/2007 | Racer et al. |
| 2016/0010660 | A1* | 1/2016 | Key ........................ F04D 29/20 29/244 |
| 2017/0037873 | A1* | 2/2017 | VanWinkle ............. B23P 19/04 |
| 2017/0072547 | A1 | 3/2017 | Miller et al. |
| 2018/0320704 | A1 | 11/2018 | Johnson et al. |

* cited by examiner

DEVICE, METHOD, AND SYSTEM FOR REMOVING A PUMP IMPELLOR FROM A PUMP SHAFT

BACKGROUND OF THE INVENTION

The present invention relates to American National Standards Institute (ANSI™) pumps and, more particularly, to a device, method, and system for removing an ANSI™ pump impellor from the ANSI™ pump. An ANSI™ pump is a centrifugal process pump that meets the standards of the American National Standards Institute.

An impellor is a rotating component of a centrifugal pump that accelerates fluid outward from the center of rotation, thus transferring energy from the motor that drives the pump to the fluid being pumped. An impellor is usually a short cylinder with an open inlet (called an eye) to accept incoming fluid, vanes to push the fluid radially, and a splined, keyed, or threaded bore to accept a drive shaft.

Sometimes an ANSI™ pump (e.g., DURCO™ style) pump impellor cannot be uncoupled from the pump shaft, and the standard pump impellor wrench doesn't work to unthread the impellor. Existing impellor wrenches used on these pumps can't apply the sufficient force necessary to do this, especially when the threads of the impellor (i.e., the threads of the threaded bore that accepts the drive shaft of the pump) often are galled, so the force of the wrench is not enough. Thread galling occurs during installation when pressure and friction cause bolt threads to seize to the threads of a nut or tapped hole.

As can be seen, there is a need for the device, method, and system for removing a pump impellor from the pump as detailed herein, wherein the impact wrench has a hammer mechanism for delivering a hammer shock effect to unseize the impellor threads, wherein the torque applied is a continuous forceful "impact" to break free the stuck impellor threads.

SUMMARY OF THE INVENTION

In one aspect of the present invention, a method for removing an impellor from an operatively associated drive shaft, the method including preventing rotation of the impellor in a first direction; and simultaneously applying a torque to the drive shaft in the first direction, whereby the torque comprises continuous hammer impacts.

In another aspect of the present invention, the method for removing an impellor from an operatively associated drive shaft further includes wherein the first direction is counterclockwise rotation, wherein application of the torque to the drive shaft is by way of an impact wrench, wherein a socket is coupled to the impact wrench, and wherein the socket provides a shaft key to operatively associate with a shaft notch of the drive shaft, wherein prevention of rotation of the impellor is by way of a brace dimensioned and shape to interconnect the impellor with a supporting element, wherein the supporting element is an elongated fastener fixed to a non-rotating structure, wherein the brace is an elongated object extending between a first end and a second end, wherein the brace has a notch adjacent the first end, and wherein the brace has a hole adjacent the second end for receiving the elongated fastener.

In yet another aspect of the present invention, a system for unthreading an impellor having a galled association with a drive shaft includes the following: a brace for preventing rotation of the impellor in a first direction, wherein the brace is an elongated object extending between a first end and a second end, wherein the brace has a notch adjacent the first end, and wherein the notch is dimensioned and shaped for engaging the impellor for preventing rotation thereof; an impact wrench for applying torque to the drive shaft in the first direction; and an elongated fastener for forming a fixed connection to a supporting structure, wherein the brace has a hole adjacent the second end for receiving the elongated fastener when it is fixed to the supporting structure, whereby the brace prevents rotation of the impellor, wherein the elongated fastener is a bolt, the bolt is fixed to the supporting structure, and wherein the supporting structure is a pump providing the drive shaft, and wherein a socket is coupled to the impact wrench, and wherein the socket provides a shaft key to operatively associate with a shaft notch of the drive shaft.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a socket used on a pump input and an impellor brace. In use, the socket is coupled to an impact wrench. The impellor of the pump is blocked from rotating by a brace. The impact wrench and socket may be run in reverse to unscrew the impellor. The device can advantageously remove a badly stuck ("galled") impellor instead of cutting the pump shaft. The impact wrench with the socket can shock loose the galled threads of the impellor and shaft.

Figure 1:
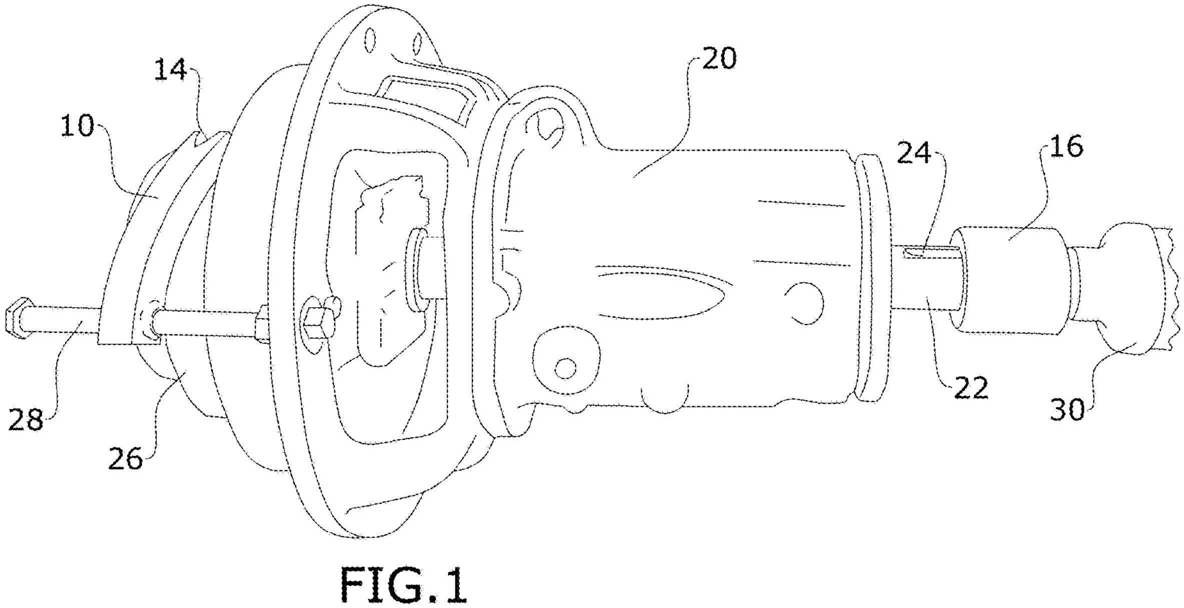
FIG. 1 is a side elevation view of an exemplary embodiment of the present invention, shown in use.
Figure 2:
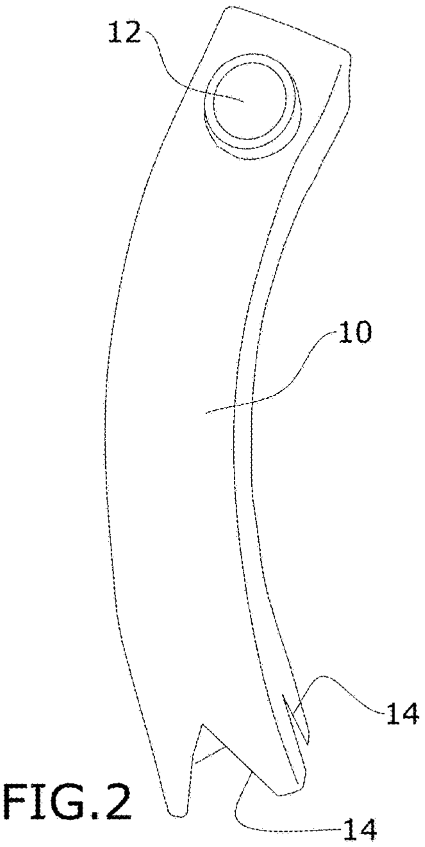
FIG. 2 is a side elevation view of an impellor brace of an exemplary embodiment of the present invention.
Figure 3:
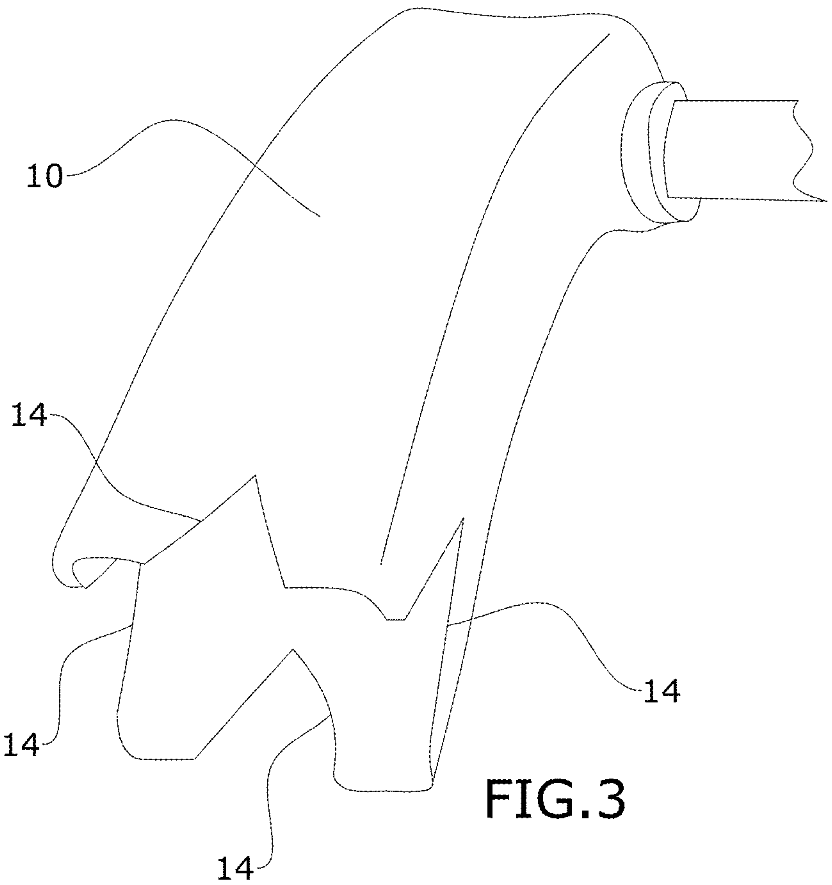
FIG. 3 is a perspective view of the impellor brace of an exemplary embodiment of the present invention.
Figure 4:
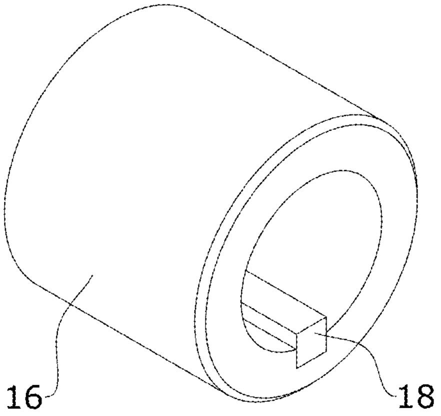
FIG. 4 is a perspective view of an impact socket of an exemplary embodiment of the present invention.
Figure 5:
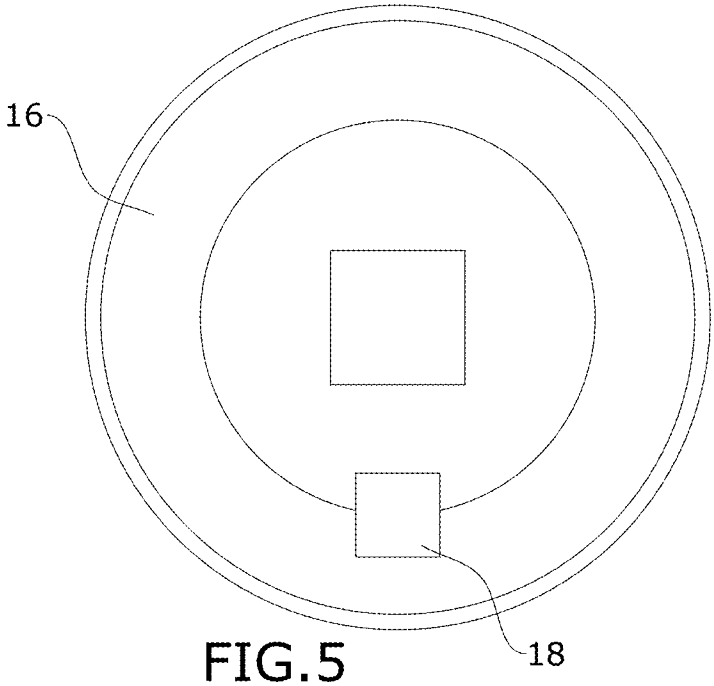
FIG. 5 is an elevation view of the impact socket of FIG. 4.
Figure 6:
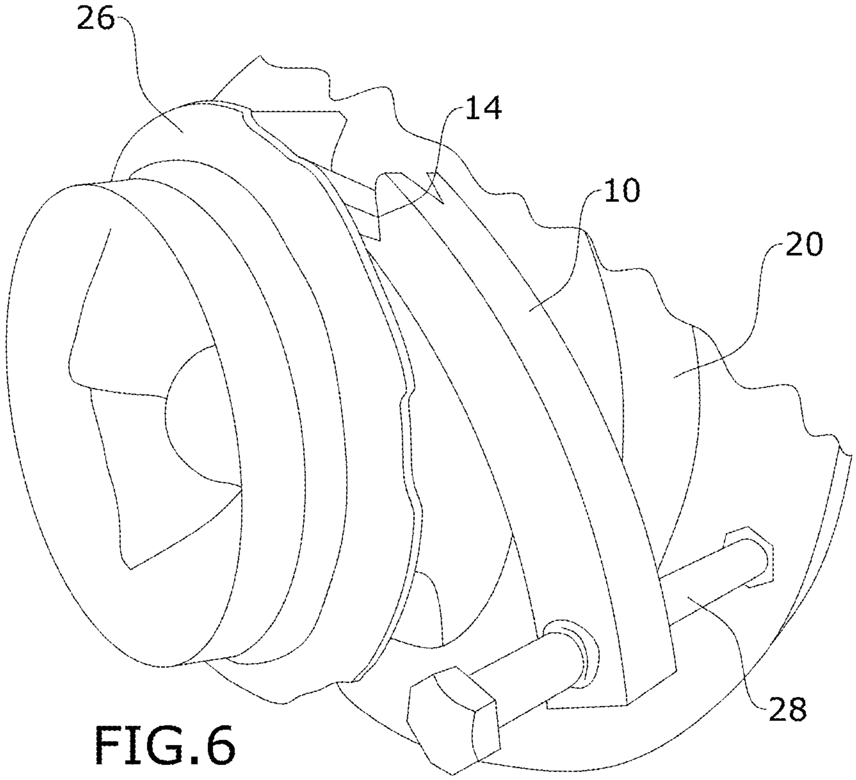
FIG. 6 is a detailed perspective view of an exemplary embodiment of the present invention, shown in use.

Referring now to FIGS. 1 through 6, embodiments of the present invention may include the following:

10: is the impellor brace
12: is the bolt hole
14: is the impellor notch
16: is the socket
18: is the shaft key
20: is the ANSI pump
22: is the pump shaft
24: is the shaft notch
26: is the impellor
28: is the bolt
30: is the impact wrench The impact wrench socket 16 is provided with a shaft key 18 that mates with a shaft notch 24 defined in a pump shaft 22 of an ANSI pump 20. An impellor brace 10 is provided with a curved main body that has an opening 12 on one side and an impellor notch 14 at an opposite end thereof. As shown in FIGS. 1 and 5, an elongated fastener 28 (such as but not limited to a bolt) can be secured to a mid-section of ANSI pump 20. Once secured, the impellor brace 10 is slid onto the elongated fastener 28 via the opening 12 and the impellor notch 14 engages a blade of the impellor 14.

As will be appreciated by those with skill in the art, rather than being provided separately, the elongated fastener 28 may also be provided as already assembled or operatively associated with the brace 10, thus forming an impellor brace unit. When the pump shaft 22 is rotated counterclockwise via the socket 16, the impellor 26, which would normally rotate in unison with the pump shaft 22, is prevented from rotating by the brace 10. As this occurs, the impellor 26 slides outwardly from the rest of the pump 20. Due to the slidable nature of the brace 10 on the elongated fastener 28, the brace 10 is maintained in position relative to the impellor 26 to continue to prevent its rotation. Thus, the torque from the impact wrench 30 and socket 16 (which is mounted on the wrench 30) is transferred to the shaft threads to unscrew the stuck or galled impellor threads.

This tool may be used when an impellor must be changed but is stuck on the pump shaft. Further, it may be made in various appropriate ways, such as in a machine shop or a light manufacturing company.

While one or more preferred embodiments are disclosed, many other implementations will occur to one of ordinary skill in the art and are all within the scope of the invention. Each of the various embodiments described above may be combined with other described embodiments to provide multiple features. Furthermore, while the preceding describes several separate embodiments of the apparatus and method of the present invention, what has been described herein is merely illustrative of applying the principles of the present invention. Other arrangements, methods, modifications, and substitutions by one of ordinary skill in the art are therefore also considered within the scope of the present invention, which is not to be limited except by the claims directed to the present invention.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method for removing an impellor from an operatively associated drive shaft, the method comprising:

connecting an elongated member to a non-rotating structural element associated with the impellor;

interconnecting a slidable brace between the elongated member and one or more blades of the impellor so as to prevent rotation of the impellor in a first direction; and applying a torque to the drive shaft in the first direction by way of continuous hammer impacts, wherein when said one or more blades move axially during the continuous hammer impacts the slidable brace rides along the elongated member so as to move in concert axially with said one or more blades.

2. The method of claim 1, wherein the first direction is counterclockwise rotation.

3. The method of claim 1, wherein the slidable brace is an elongated object extending between a first end and a second end, wherein the slidable brace has a notch adjacent the first end, and wherein the slidable brace has a hole adjacent the second end for receiving the elongated member.

4. The method of claim 1, wherein application of the torque to the drive shaft is by way of an impact wrench.

5. The method of claim 4, wherein a socket is coupled to the impact wrench, and wherein the socket provides a shaft key to operatively associate with a shaft notch of the drive shaft.

* * * * *